US005210392A

United States Patent [19]

Labrot et al.

[11] Patent Number: 5,210,392

[45] Date of Patent: May 11, 1993

[54] PLASMA TORCH INITIATED BY SHORT-CIRCUIT

[75] Inventors: Maxime Labrot; Didier Pineau; Jean Feuillerat, all of Bordeaux, France

[73] Assignee: Societe Anonyme dite: Aerospatiale Societe Nationale Industrielle, Paris, France

[21] Appl. No.: 610,437

[22] Filed: Nov. 7, 1990

[30] Foreign Application Priority Data

Nov. 8, 1989 [FR] France ................................ 89 14677

[51] Int. Cl.[5] ................................................ B23K 9/00

[52] U.S. Cl. .......................... 219/121.52; 219/121.49; 219/121.57; 219/121.54

[58] Field of Search ...................... 219/121.52, 121.49, 219/121.57, 121.54, 75, 121.44

[56] References Cited

U.S. PATENT DOCUMENTS

| | | | |
|---|---|---|---|
| 3,211,944 | 10/1965 | Fein | 219/121.52 |
| 3,301,995 | 1/1967 | Eschenbach et al. | 219/121.52 |
| 4,034,250 | 5/1977 | Kiselev et al. | 219/121.52 |
| 4,567,346 | 1/1986 | Marhic | 219/121.52 |
| 4,596,918 | 6/1986 | Ponghis | 219/121.48 |
| 4,788,408 | 11/1988 | Wlodarczyk et al. | 219/121.52 |
| 4,791,268 | 12/1988 | Sanders et al. | 219/121.52 |
| 4,896,016 | 1/1990 | Broberg et al. | 219/121.57 |
| 4,929,811 | 5/1990 | Blankenship | 219/121.57 |

*Primary Examiner*—Mark H. Paschall
*Attorney, Agent, or Firm*—Marshall, O'Toole, Gerstein, Murray & Bicknell

[57] ABSTRACT

A plasma torch includes two tubular coaxial electrodes, at least one of which is axially movable between an operating position in which the movable electrode is spaced from the other electrode and an initiating position in which the movable electrode is in contact with the other electrode, thus establishing an electric short circuit so as to generate an electric arc upon rupture of the electric short circuit hen the mobile electrode is brought back to its operating position. Each electrode is contained in a support provided with a cooling circuit, through which a cooling fluid circulates. The cooling circuit associated with the movable electrode is provided with a seal which permits the electrode to be moved without creating any leaks in the cooling circuit.

15 Claims, 2 Drawing Sheets

PLASMA TORCH INITIATED BY SHORT-CIRCUIT

FIELD OF THE INVENTION

The present invention concerns the technology relating to plasma torches.

BACKGROUND OF THE INVENTION

Generally speaking, a plasma torch, such as the one mentioned in the document U.S. Pat. No. 3,301,995, includes two coaxial tubular electrodes with one in prolongation of the other, each of the electrodes being disposed in a support surrounding it. The plasma torch comprises means to produce the initiating of an electric arc between the two electrodes, as well as means to inject plasmagene gas, such as air, into a chamber between said electrodes. In addition, electrode cooling means are provided in each electrode support. Advantageously, the plasma torch is provided with means to move the catching feet of the electric arc so as to avoid any premature wear of the internal surfaces of the tubular electrodes. In order to achieve this, these means include at least one electromagnetic coil surrounding one of the electrode supports and, by modulating the axial magnetic field delivered by the coil, the catching feet of the electric arc thus move along said internal surfaces of the electrodes.

As regards initiating of the electric arc, there are basically two distinct methods.

In the first method, a high voltage (several tens of kilovolts) is applied to the terminals of the electrodes, which generates a discharge (disruptive breakdown) between the two electrodes and produces the electric arc. This solution requires that a short distance needs be provided between the opposite faces of the electrodes and thus complicates the arrangement of the chamber for injecting the plasmagene gas. In addition, an auxiliary power unit is necessary.

According to the other method, a temporary short-circuit is effected between the electrodes by means of an auxiliary, expansible and retractable initiating electrode, such as the one described in the documents FR-Pat. No. 2 479 587 and U.S. Pat. No. 3,301,995. This method requires that a complex mechanical device be provided outside the torch so as to actuate the initiating electrode which requires an additional external spatial requirement. However, this initiating method by short-circuit is more reliable and less expensive than the initiating method by discharge.

SUMMARY OF THE INVENTION

The object of the present invention is to mitigate these drawbacks and concerns a plasma torch, the electric arc initiating means of said torch, of the short-circuit type, being mechanically simple and without the plasma torch requiring a large spatial requirement.

To this effect, the plasma torch of the type comprising:

two coaxial tubular electrodes with one in prolongation of the other, each electrode being disposed in a support in which a circuit is provided to cool the corresponding electrode;

means to produce the initiating of an electric arc between the two electrodes by temporarily short-circuiting the latter; and means to inject a plasmagene gas between the two electrodes, is notable in that according to the invention, in order to produce initiating of the electric arc between the two electrodes, at least one of said electrodes is axially mobile between one torch operating position for which said mobile electrode is distanced from the other electrode, and one initiating position for which said mobile electrode is in contact with the other electrode thus establishing an electric short-circuit so as to generate said electric arc upon rupture of the electric short-circuit when said mobile electrode is brought back to its operating position.

Thus, according to the invention, the plasma torch is freed from an auxiliary start up electrode by virtue of the mobility capacity of one of said electrodes. Consequently, apart from the technical simplication resulting from the above, the plasma torch no longer exhibits the conventional external protuberances brought about by these auxiliary electrodes and their mechanisms.

So as to allow for the axial displacement of the mobile electrode, the means to produce said electric arc may include at least one actuating device associated with said mobile electrode and able to impart to it a translation movement between the two positions, respectively the operating and initiating positions, with respect to the corresponding support surrounding said electrode.

Advantageously, said mobile electrode corresponds to the upstream electrode (with respect to the circulation of the plasmagene gas). In addition, when said mobile electrode is in the initiating position, its end face is preferably in contact with a pin projecting with respect to the corresponding end face of said other electrode. Furthermore, the axial displacement of said mobile electrode with respect to said support, in which said electrode cooling circuit is fitted, is tightly effected by means of seals.

In one preferred embodiment, said device for actuating the mobile electrode is a fluid type device. In this case, said actuating device may comprise at least one jack or similar member disposed coaxially to the electrodes and whose sliding rod is connected to the end of the mobile electrode opposite the end intended to come into contact with the other electrode. The actuating device is simple to embody and reliable in use.

In another embodiment, said actuating device may carry out an overpressure of the fluid of said cooling circuit of said electrode so as to ensure, with respect to the corresponding support, its displacement from its position distanced from the other electrode to its initiating position, and elastic return means to spontaneously bring back said electrode from its initiating position to its operating position when said overpressure of the cooling fluid ceases. These elastic return means then include a compression spring inserted around the mobile electrode between an external shoulder terminating the rear end of the electrode and said support.

In a known way, the plasma torch is of the type in which the cooling circuit of at least one electrode is defined by a sealed cylindrical chamber provided in the corresponding support and separated by a cylindrical separation wall dividing the chamber into two concentric annular spaces communicating with each other at one end of said wall and through which said cooling fluid circulates, and of the type including electromagnetic coil means to move the catching feet of the electric arc between the electrodes so as to avoid any premature wear of the internal surfaces of the tubular electrodes.

In this case, the plasma torch is also notable in that the cooling fluid of said electrode, whose sealed cylindrical chamber comprises the separation wall, is electrically nonconducting and in that said electromagnetic coil forms said separation wall.

Thus, it can be seen that the external spatial requirement, normally imposed by the electromagnetic coils on the plasma torches, is suppressed since the coil is suitably adapted to act as a separation wall.

The electromagnetic coil is preferably associated with the support surrounding the mobile electrode and, in one advantageous embodiment, it is defined by two concentric windings of contiguous spires obtained from a continuous metallic wire, a casing made of a nonconducting material being inserted between the two concentric windings of spires.

In addition, as regards current plasma torches, said means for injecting the plasmagene gas between the electrodes generally include a metallic revolution piece coaxial to the electrodes and delimiting with the latter and their supports a chamber in which the gas is injected via transversal orifices made in the piece. This piece, exposed to the thermic radiation generated by the electric arc, is equipped with cooling means, such as longitudinal passages placed in communication with the circuit for cooling the downstream electrode.

Now, after the piece has been subjected to various tests and measurements, it has been observed that the temperatures reached by the piece were not as high as one would have expected, especially due to the fact that the injection of the fresh plasmagene gas into the chamber constitutes a thermic protection layer at the periphery of the internal wall of the piece.

To this effect, according to another characteristic of the invention, the plasma torch, of the type in which said means to inject a plasmagene gas between the two electrodes include a revolution piece coaxial to the electrodes and defining with the latter and their supports a chamber into which the plasmagene gas is injected via transversal orifices made in the piece, is notable in that said revolution piece is without internal cooling means.

Accordingly, the embodiment of the injection piece is then simplified.

Moreover, as the piece is not exposed to high temperatures, it may be embodied by an electrically nonconducting non-metallic material, such as a plastic material, which avoids the use of electrically nonconducting devices between the two electrodes initially provided when the revolution piece is metallic.

According to another characteristic of the invention, said electrode supports are housed inside a cylindrical casing, an annular chamber being provided between the support of the upstream electrode (with respect to the circulation of the plasmagene gas) and said casing in order to bring the plasmagene gas to said injection means.

This arrangement thus provides the torch with extreme compactness.

Furthermore, the plasmagene gas feeding pipe, the pipes of said circuits for cooling the electrodes and the electric power line of the electromagnetic coil all then advantageously arrive inside said cylindrical casing.

BRIEF DESCRIPTION OF THE DRAWINGS

The figures of the accompanying drawing shall show how the invention may be best embodied. Identical references on these figures denote similar elements.

DETAILED DESCRIPTION OF THE PREFERRED EMBODIMENTS

Figure 1:
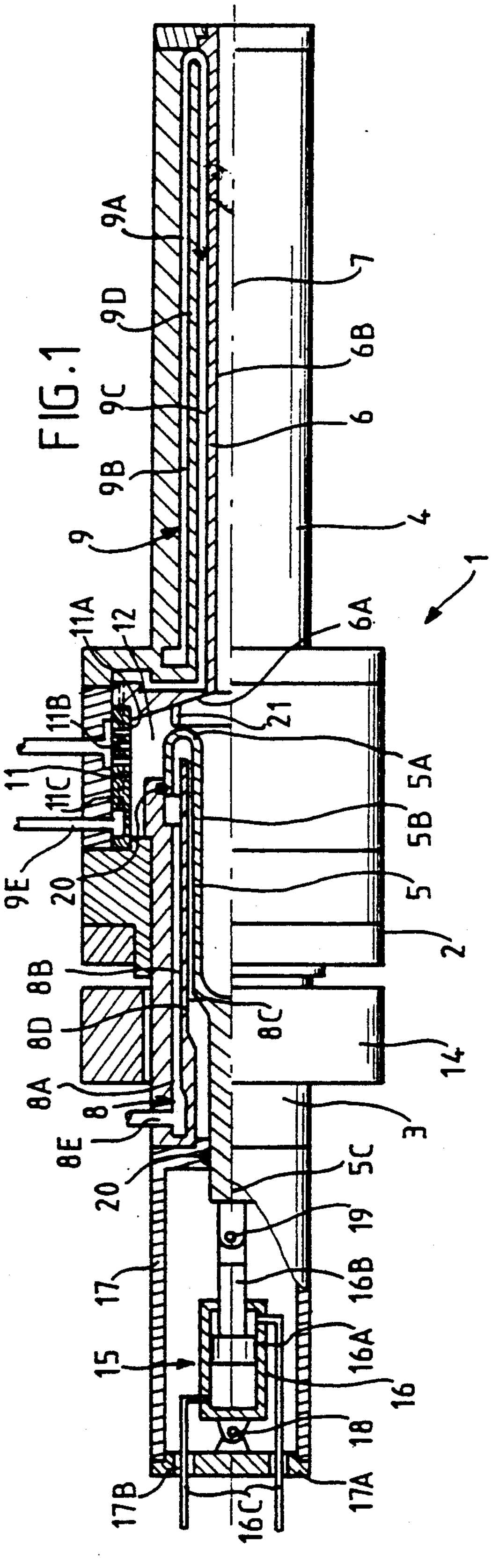
FIG. 1 diagrammatically represents a half-view in longitudinal section contiguous to an external half-view of an embodiment of the plasma torch of the invention in which said mobile upstream electrode is, under the effect of the actuating device, in the initiating position.
Figure 2:
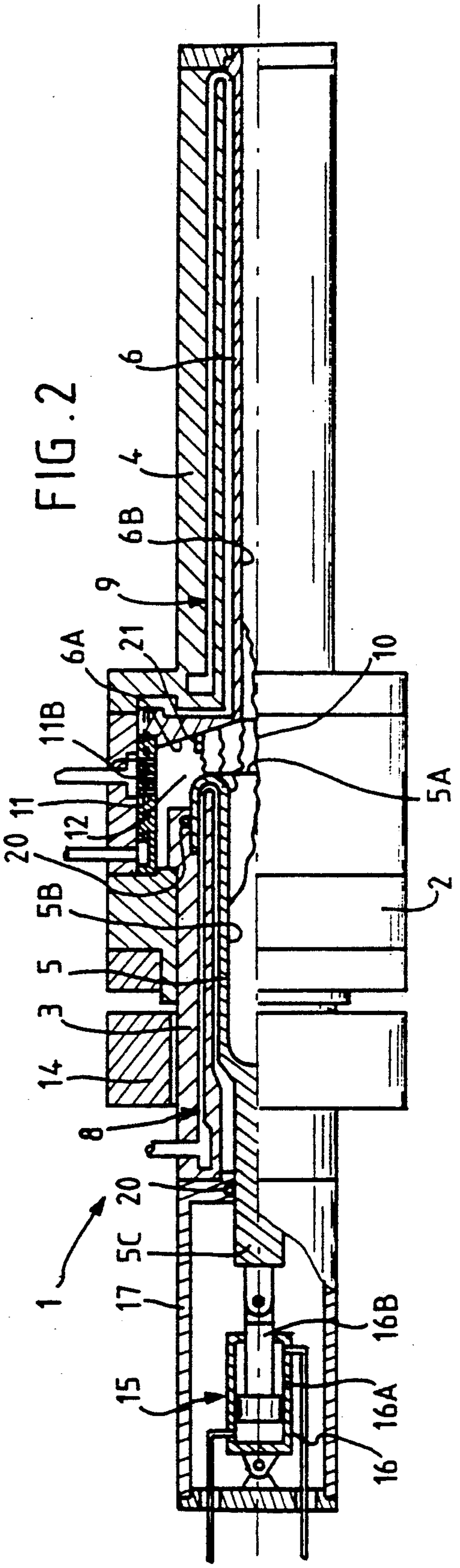
FIG. 2 is a view similar to the previous one, for which said mobile electrode occupies its operating position, an electric arc being established between the two electrodes.

With reference for FIGS. 1 and 2, the plasma torch 1 shown comprises a body 2 including two coaxial cylindrical supports 3 and 4. An upstream electrode or cathode 5 is housed inside the cylindrical support 3, whereas a downstream electrode or anode 6 is housed inside the cylindrical support 4. These electrodes 5 and 6 have a general tubular shape and are disposed with one in prolongation of the other coaxially to the longitudinal axis 7 of the body of the torch. As shall be seen subsequently, these electrodes may be placed in contact with each other (FIG. 1) or spaced from each other (FIG. 2). The electrodes 5 and 6 are also connected to known power units (not shown).

In addition, between each support and its corresponding electrode, a cooling circuit, respectively 8 and 9, is provided with a cooling fluid circulating in said circuit.

Each cooling circuit is defined, for example, by a sealed cylindrical chamber, respectively 8A and 9A, divided into two concentric annular spaces 8B, 8C and 9B, 9C by means of a median separation wall, respectively 8D and 9D, linked to the corresponding support. The cooling fluid of each circuit arrives via an inlet respectively 8E and 9E in the chamber so as to circulate through the two annular spaces communicating with each other at the downstream end of the separation wall and return via an outlet (not shown) in the direction of the fluid feeding circuit.

In addition, when an electric arc 10 is produced between the two electrodes 5 and 6 (FIG. 2), the means to inject the plasmagene gas between the two electrodes include a revolution piece 11 coaxial to the electrodes, defining along with the opposite ends respectively 5A and 6A of the electrodes the upstream face 3A of the support 3 and its internal wall 11A, an injection chamber 12. The plasmagene gas, such as air, derived from a feeding circuit (not shown), is introduced into the chamber 12 via transversal orifices 11B embodied in the piece 11. In this embodiment, it shall also be observed that the piece 11 is provided with longitudinal passages 11C advantageously placed in communication with the cooling circuit 9 of the downstream electrode 6 and thus ensuring its cooling.

The plasma torch 1 also comprises an electromagnetic coil 14 surrounding the support 3 of the upstream electrode 5 and, when a modulated magnetic field is created, authorizing the movement of the feet of the electric arc along the internal surfaces 5B and 6B of the electrodes so as to avoid any premature wear of these electrodes.

According to the invention and in this embodiment, in order to produce initiating of the electric arc 10 between the upstream and downstream electrodes 5 and 6, said upstream electrode 5 is disposed to be axially mobile between a first operating position for which it is distanced from the downstream electrode (FIG. 2) and a second initiating position, for which the upstream mobile electrode 5 is in contact with the other electrode 6, thus establishing an electric short-circuit (FIG. 1). Thus, these short-circuit type initiating means generate the creation of an electric arc 10 upon rupture of the short-circuit when the mobile electrode 5 is brought back to its first position.

FIG. 2 shows the various stages for evolution of the electric arc 10 which appears once the electric contact, established between the two electrodes 5 and 6, is broken by the backward movement of the upstream mobile electrode 5. The electric arc 10 is immediately maintained and controlled by the main electric power of the torch 1.

At this moment, the plasmagene gas is injected into the chamber 12 and, when in contact with the electric arc, produces the plasma which is ejected from the torch by the downstream electrode 6 at temperatures possibly reaching 10,000° C.

So as to impart a translation movement to the mobile electrode 5 between its first and second positions and vice versa, an actuating device 15 is associated with said electrode. In the embodiment shown on FIGS. 1 and 2, the actuating device 15 is a fluid type device and comprises a double action jack 16. This jack 16 is disposed coaxially to the longitudinal axis 7 of the torch and it is fitted in a circular box 17 extending the rear section of the support being secured to it. The cylinder 16A of the jack 16 is connected by a hinge 18 to the bottom 17A of the box, whereas the rod 16B of the jack is connected by a hinge 19 to the rear end 5C of the upstream electrode 5. The fluid-carrying pipes 16C of the jack traverse the bottom 17A of the box via holes 17B provided in said bottom. In addition, so as to avoid leaks occuring in the cooling circuit 8 of the electrode 5 when it slides with respect to the fixed support 3 surrounding it, O-ring seals 20 are provided.

It shall be observed that on FIG. 1, when the mobile electrode 5 is in the initiating position under the action of the jack 16, its front end face 5A comes into contact with a pin 21 projecting from the rear end face 6A of the downstream electrode 6.

Figure 3:
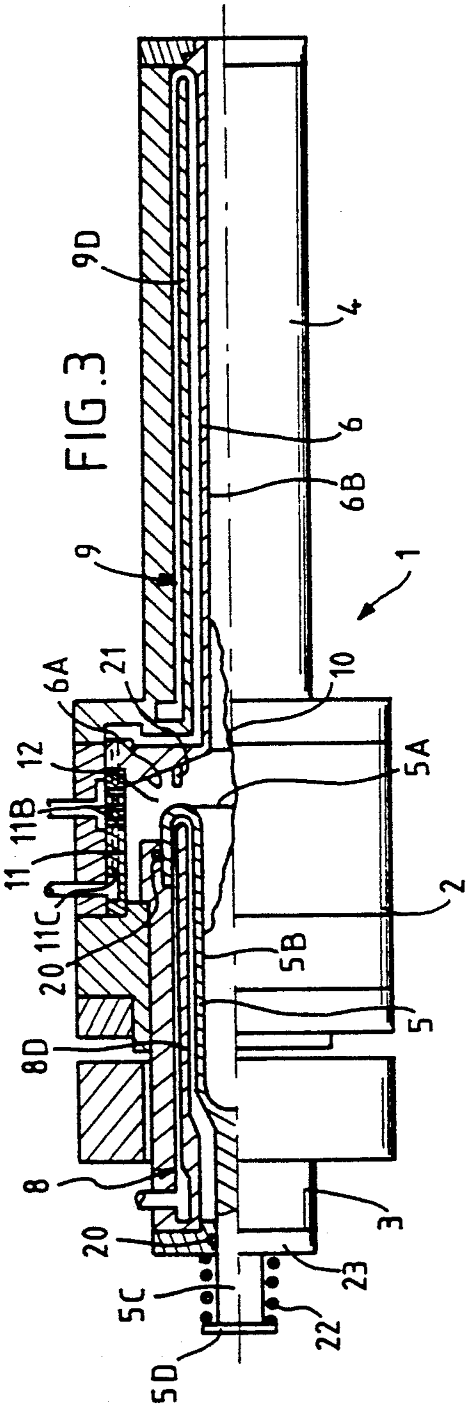
FIG. 3 is a view similar to FIG. 2 showing an embodiment variant of the device for actuating said mobile electrode.

In the device of FIG. 3, the axial displacement of the mobile electrode 5 with respect to its support 3 is effected differently. The mobile electrode 5 is shown here in its first operating position for which the electric arc 10 is generated and maintained between the two electrodes 5 and 6. In this embodiment, in order to initiate the electric arc 10, an overpressure is applied to the fluid of the cooling circuit 8 in order to slide the upstream electrode 5 from its first position to its second initiating position. When the short-circuit electric contact is established between the front end 5A of the electrode 5 and the pin 21 integral with the rear end 6A of the electrode 6, normal pressure is re-established in the cooling circuit. The return of the mobile upstream electrode 5 to its first operating position, by generating the generation of the electric arc 10 as previously, may be effected by means of a compression spring 22 inserted around the rear end 5C of the electrode between an external shoulder 5D terminating the rear end 5C and a bottom 23 sealing the support 3.

Thus, as soon as the overpressure ceases, the upstream electrode 5 spontaneously returns to its first position, as shown on FIG. 3, under the effect of the compression spring 22 thus initiating the electric arc 10.

Instead of the spring 22, it is possible to mount a single-acting jack or a similar device.

Figure 4:
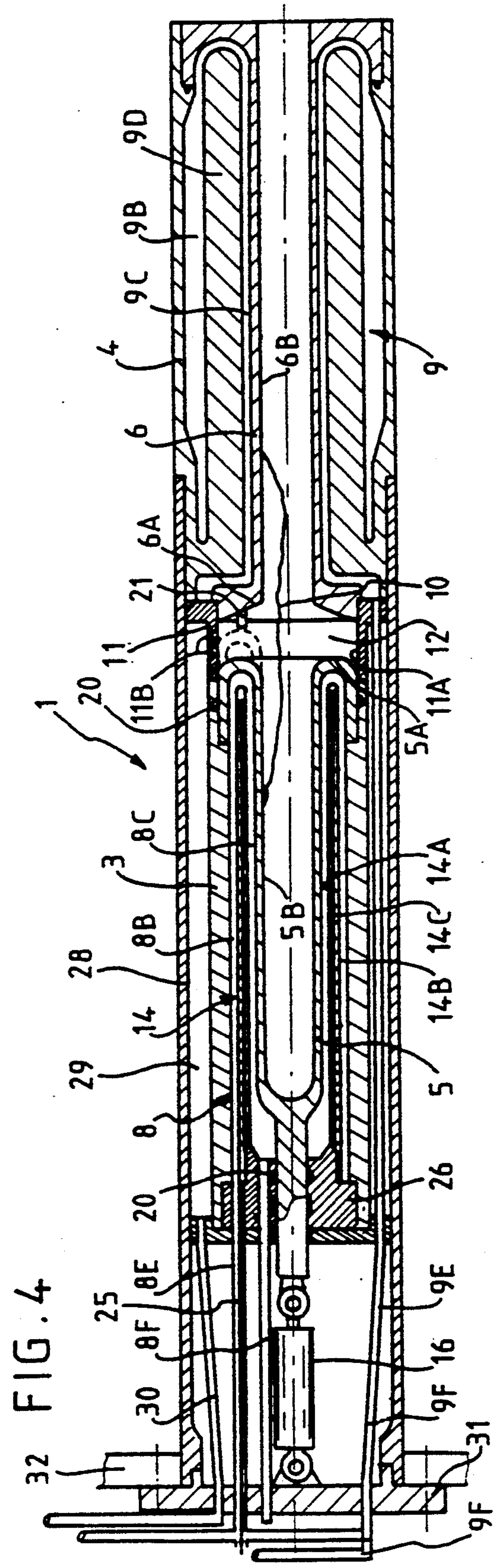
FIG. 4 represents in longitudinal section a preferred embodiment of the plasma torch of the invention.

With reference now to FIG. 4, the plasma torch shown includes the two electrodes, namely the upstream electrode 5 and the downstream electrode 6, respectively disposed in the supports 3 and 4. According to the invention, the upstream electrode 5 is rendered mobile by means of the actuating device 15 constituted in this embodiment by the double-acting jack 16.

In this preferred embodiment example of the plasma torch, the electromagnetic coil 14, initially surrounding the support 5 of the electrode on FIGS. 1 to 3, forms the separation wall 8D of the cooling circuit 8 and the cooling fluid passing through the circuit is electrically nonconducting, for example, deionized water. In the same way, the spatial requirement previously imposed by the electromagnetic coil 14 is suppressed.

This coil 14, which is thus effectively cooled by the fluid circulating in the two annular spaces 8B and 8C of the circuit, includes two concentric windings 14A and 14B with contiguous spires obtained from a continuous metallic wire made, for example, of copper and having a rectangular section.

A casing 14C made of a nonconducting material is inserted between the two spire windings. The coil 14 is connected at one end to an electric power line 25 advantageously disposed in the cooling fluid intake or feed pipe 8E and, at the other end to a ring 26 integral with the support 3. The fluid return or outlet pipe 8F is also shown.

According to another characteristic of the plasma torch illustrated on FIG. 4, the revolution piece 11 of the means for injecting the plasmagene gas is without internal cooling means, as shown on FIGS. 1 to 3, previously defined by longitudinal passages. In fact, after a large number of tests and measurements carried out on the injection piece, the Applicant has established that this piece did not undergo temperatures as high as one would have imagined.

This surprising result is mainly due to the fact that the cold plasmagene gas injected continuously into the chamber 12 via the injection orifices 11B forms an effective thermic protection barrier close to the internal wall 11A of the piece 11 against the temperature existing inside the chamber 12 where the electric arc 10 is produced. As a result, embodiment of the piece is simplified.

Moreover, as it has not been subjected to high temperatures, the revolution piece 11 may be made of plastic, such as polytetrafluorethylene. Now, as the piece 11 is then electrically nonconducting, it is no longer necessary to provide nonconducting devices able to form in addition a thermic screen between the electrodes 5 and 6.

Thus, the spatial requirement of the plasma torch is notably reduced and its making highly simplified.

The plasma torch shown on FIG. 4 now possesses extreme compactness.

In fact, the body 2 of the torch advantageously includes a cylindrical casing 28 in which the electrode supports 3 and 4 are coaxially disposed. An annular chamber 29 is then fitted between the support 3 and the casing 28. The plasmagene gas feed pipe 30 is connected to this chamber, whereas the feed 9E and return 9F pipes of the cooling circuit 9 of the downstream electrode 6 traverse the chamber 29.

Advantageously, it can be seen that the various plasmagene gas and cooling fluid pipes all arrive inside the cylindrical casing 28 via a bottom 31 associated with the latter. This disposition of the pipes thus guarantees them with effective protection, whereas in current plasma torches, most of these pipes arrive outside, which involves an additional spatial requirement rendering them dangerously exposed.

The cylinder of the actuating jack 16 of the mobile electrode 5 is hinged to the bottom 31 of the cylindrical casing 30. This bottom may be fixed to a structure 32 rendering stationary the plasma torch which is then ready to be operated.

The various feedings of plasmagene gas and cooling fluid, as well as the electric power supplies of the electrodes and the coil, are connected to a control system (not shown) ensuring the good operation of the plasma torch in accordance with the criteria assigned to it.

What is claimed is:

1. Plasma torch comprising: two tubular coaxial axially spaced electrodes, each electrode being disposed in a support and at least one of said electrodes being axially movable between one torch-operating position in which said movable electrode is in contact with the other electrode, thus establishing an electric short circuit so as to generate an electric arc between said two electrodes upon rupture of the electric short circuit when said movable electrode is brought back to its operating position;

means to inject a plasma gas between the two electrodes;

cooling circuits in said supports for supplying a cooling fluid to exterior of said electrodes, the cooling circuit associated with said axially movable electrode having an effective length in contact with said movable electrode which varies with the position of said movable electrode; and sealing means for sealing the cooling circuit associated with said axially movable electrode regardless of the position of said axially mobile electrode.

2. Plasma torch according to claim 1, further including at least one actuating device associated with said mobile electrode and able to impart to it a translation movement between the said operating and initiating positions, with respect to its associated support.

3. Plasma torch according to claim 1, wherein said mobile electrode is the upstream electrode with respect to flow of the plasma gas.

4. Plasma torch according to claim 1, wherein, when said mobile electrode is in the initiating position, its end face is in contact with a pin projecting with respect to the corresponding end face of the other said electrode.

5. Plasma torch according to claim 1, wherein said sealing means are O-ring seals.

6. Plasma torch according to claim 2, wherein said device for actuating the mobile electrode is a fluid type device.

7. Plasma torch according to claim 6, wherein said actuating device comprises at least one jack disposed coaxially to the electrodes and having a sliding rod connected to the end of the movable electrode opposite the end intended to come into contact with the other electrode.

8. Plasma torch according to claim 2, wherein said actuating device carries out an overpressure of the fluid of said cooling circuit of said electrode so as to ensure, with respect to the corresponding support, its displacement from its position distanced from the other electrode to its initiating position, and elastic return means to spontaneously bring back said electrode from its initiating position to its operating position when said cooling fluid overpressure ceases.

9. Plasma torch according to claim 8, wherein said elastic return means include a compression spring inserted around the mobile electrode between an external shoulder terminating at the rear end of the electrode and said support.

10. Plasma torch according to claim 1 in which the cooling circuit of at least one electrode is defined by a sealed cylindrical chamber provided in the corresponding support and separated by a cylindrical separation wall dividing the chamber into two concentric annular spaces communicating with each other at one end of said wall and through which said cooling fluid circulates, said torch further including electromagnetic coil means to move the catching feet of the electric arc between the electrodes, wherein the cooling fluid of said electrode, whose sealed cylindrical chamber comprises the separation wall, is electrically nonconducting, and wherein said electromagnetic coil forms said cylindrical separation wall.

11. Plasma torch according to claim 10, wherein said electromagnetic coil is associated with the support surrounding the mobile electrode and wherein it is defined by two concentric windings with contiguous spires obtained from a continuous metallic wire, a casing made of a nonconducting material being inserted between the concentric spire windings.

12. Plasma torch according to claim 1 in which said means to inject a plasma gas between the two electrodes include a revolution piece coaxial to the electrodes and defining with the latter and there supports a chamber into which the plasma gas is injected via transverse orifices embodied in the piece, wherein said revolution piece is without internal cooling means.

13. Plasma torch according to claim 12, wherein said revolution piece is made of an electrically nonconducting non-metallic material.

14. Plasma torch according to claim 1, wherein said electrode supports are housed inside a cylindrical casing, an annular chamber being fitted between the support of the upstream electrode with respect to circulation of the plasma gas and said casing so as to bring the plasmagene gas to said injection means.

15. Plasma torch according to claim 4, wherein the plasma gas feed pipe, the pipes of said cooling circuits of the electrodes and the electric power supply line of the electromagnetic coil all arrive inside said cylindrical casing.

* * * * *